UNITED STATES PATENT OFFICE.

CHARLES E. HITE, OF PHILADELPHIA, PENNSYLVANIA.

HEAT-INSULATING MATERIAL AND METHOD OF MAKING SAME.

1,230,297.   Specification of Letters Patent.   Patented June 19, 1917.

No Drawing.   Application filed August 18, 1916.   Serial No. 115,649.

*To all whom it may concern:*

Be it known that I, CHARLES E. HITE, a citizen of the United States, residing at Philadelphia, in the county of Philadelphia, State of Pennsylvania, have invented a new and useful Heat-Insulating Material and Methods of Making Same, of which the following is a specification.

My invention relates to an improved heat insulating material and the method of making same. The object is to provide an improved insulating material, suitable for covering steam and hot and cold water pipes, refrigerating machinery, boilers and furnaces, and for numerous other uses requiring insulation of high efficiency, which is non-combustible, durable and light in weight.

It is a well known fact that the efficiency of material used as insulation for heat or cold depends largely upon the percentage of voids or air spaces for containing dead air in the insulating medium.

Among the best insulating mediums or materials now in use, may be mentioned hair felt, cork, carbonate of magnesia and asbestos. These materials are expensive, and each has certain disadvantages.

The present invention consists in the production of an extremely porous substance by the use of a suitable suspending agent such as a carbo-hydrate formed into a paste with water. This liquid paste is sufficiently gelatinous in character to be capable of holding in suspension until set, a powdered material such as calcium sulfate (plaster of Paris) or other like material, whereby a greater quantity of water or other fluid can be mixed with the given quantity of plaster than would ordinarily be possible.

The significance of the invention will immediately become manifest upon realizing the following facts:—

The greatest amount of water that can be actually mixed with plaster of Paris is one and one half parts water to one part of plaster. Thus the original plaster can only be increased to a total dimension or bulk of about double its original volume by mixing with water.

As a result of my method one part of plaster of Paris by weight can be mixed with six parts of water by weight. This will result in a mass, formed from the same bulk of plaster, having a volume six times its original cubical volume.

As an example of the method and the product resulting therefrom I combine 600 cubic centimeters of water, 24 grams of starch and 100 grams of calcium sulfate in the following manner: I bring to a boiling point 500 centimeters of water; I mix thoroughly with 100 centimeters of cold water, 24 grams of starch. This mixture is poured into and thoroughly mixed with the 500 cubic centimeters of boiling water, and the boiling continued for a few minutes, thereby forming a paste. While the mixture is still hot or after it has cooled, 100 grams of calcium sulfate is rapidly stirred into the liquid paste, and after becoming thoroughly mixed, the entire mass is poured into a suitable mold or molds. After the mass has become set, it is of a uniform consistency throughout, occupying approximately a little more than 600 cubic centimeters. The water is now evaporated at a temperature approximately from 200° F. to 212° F. The resulting product is extremely porous, owing to the large percentage of air cells, and is a good insulating medium, possessing considerable strength and being very light in weight.

If desired, one gram of borax or alum or other paste preservative may be added to the mixture of carbo-hydrate and water.

This mass of carbo-hydrate, water and sulfate, is at first quite fluid, but soon sets and becomes firm. The action of the carbohydrate paste is to hold the particles of sulfate in suspension, preventing settling until the sulfate hardens, then on the evaporation of the water, a substance is produced full of air cells, which has proved of greater insulating efficiency, as above stated, than insulating substances composed of 85% carbonate of magnesia and 15% asbestos.

In some instances and for certain purposes it is necessary to water-proof the material. This I accomplish by adding to the paste one per cent., for example, of a vegetable or animal oil, such as linseed oil or fish oil, or mineral oil, such as petroleum, or the asphaltum residue from the distillation of crude oil. After the water has been evaporated, at a heat ranging approximately 500° F. or higher, these substances either oxidize or carbonize, as in the case of resins, asphalts or other hydrocarbons having a melting point above 60° F.

In cases where the insulating material has to stand a heat above 300° F, or a harder material is desired, such material is produced by adding to the paste one per cent., for example, of borax and one per cent. of oxid of iron. These materials tend to flux under the influence of sufficient heat, or in other words a temperature of 500° F., or over, thereby adding greatly to the strength of the article produced; or a harder material can be made by the addition to the paste of what is known as glutrin, or sulfite pitch and subjecting the composition to a temperature of 500° F., or over, during the process of drying.

It is to be understood that the proportions of the various materials may be varied to suit different requirements.

The liquid mixture as described, is poured into suitable molds, allowed to set, and then is dried at a temperature ranging from approximately 212° F. to 700° F. At the higher temperatures, the starch undergoes a chemical change and is not thereafter affected by the heat from any steam pipes.

When borax and oxid of iron, $Fe_2O_3$, are added to the paste, the dried substances have been found to withstand a temperature of 1700° F. for four hours or more, without cracking or disintegrating, and it becomes even harder than the original substance.

To the plaster of Paris may be added calcined magnesium carbonate with the result that the material produced is lighter and of slightly more efficient insulating character.

It will be understood that plaster-of-Paris and carbo-hydrate paste are given in the above description, merely as examples of a suitable material and a suitable suspending agent, in order to effect the process and secure the product desired. Other substances and agents may obviously be used with similar results.

The essence of the invention, is the suspension of the particles of a suitable powdered material such as calcium sulfate, calcium hydroxid, or diatomaceous earth, by an agent, such for example as a carbo-hydrate paste, until the material is changed from a fluid or semi-fluid state to a self-sustaining and extremely porous body.

What I claim is:—

1. The method which consists in forming a fluid or semi-fluid mass by suspending the particles of a powdered mineral material in a previously prepared viscous liquid agent until the material becomes self-sustaining, and then evaporating the moisture, thereby producing a body provided with air cells.

2. The method which consists in associating the particles of a powdered mineral material with a previously prepared suspending agent to form a fluid mass and to hold the mineral particles in suspension until the material becomes self-sustaining, and then evaporating the moisture, thereby producing a porous body.

3. The method which consists in mixing a carbo-hydrate paste with water, and thoroughly mixing therewith calcium sulfate to be held in suspension then allowing the mixture to set in a mold and then evaporating the moisture therefrom.

4. The method which consists in mixing plaster-of-Paris with a carbo-hydrate paste mixed with water, so that the paste will hold the plaster in suspension until it has set and then evaporating the moisture therefrom.

5. The method which consists in making a paste by mixing a carbo-hydrate with a quantity of water, and thoroughly mixing therewith calcium sulfate to be held in suspension, then allowing the mixture to set in a suitable mold and then evaporating the moisture.

6. The method which consists in mixing a carbo-hydrate paste to which is added borax and oxid of iron, with water, and thoroughly mixing therewith calcium sulfate to be held in suspension and then allowing the mixture to set in a suitable mold.

7. A heat insulating body composed of mineral particles formed into a porous self-sustaining mass by first suspending the particles in a liquid paste until the mass has set, and then evaporating the moisture therefrom.

8. A heat insulating body composed of mineral particles formed into a porous self-sustaining mass by first suspending the particles in a liquid paste until the mass has set in a suitable mold, and then evaporating the moisture therefrom.

CHARLES E. HITE.

Copies of this patent may be obtained for five cents each, by addressing the "Commissioner of Patents, Washington, D. C."